Patented Sept. 28, 1954

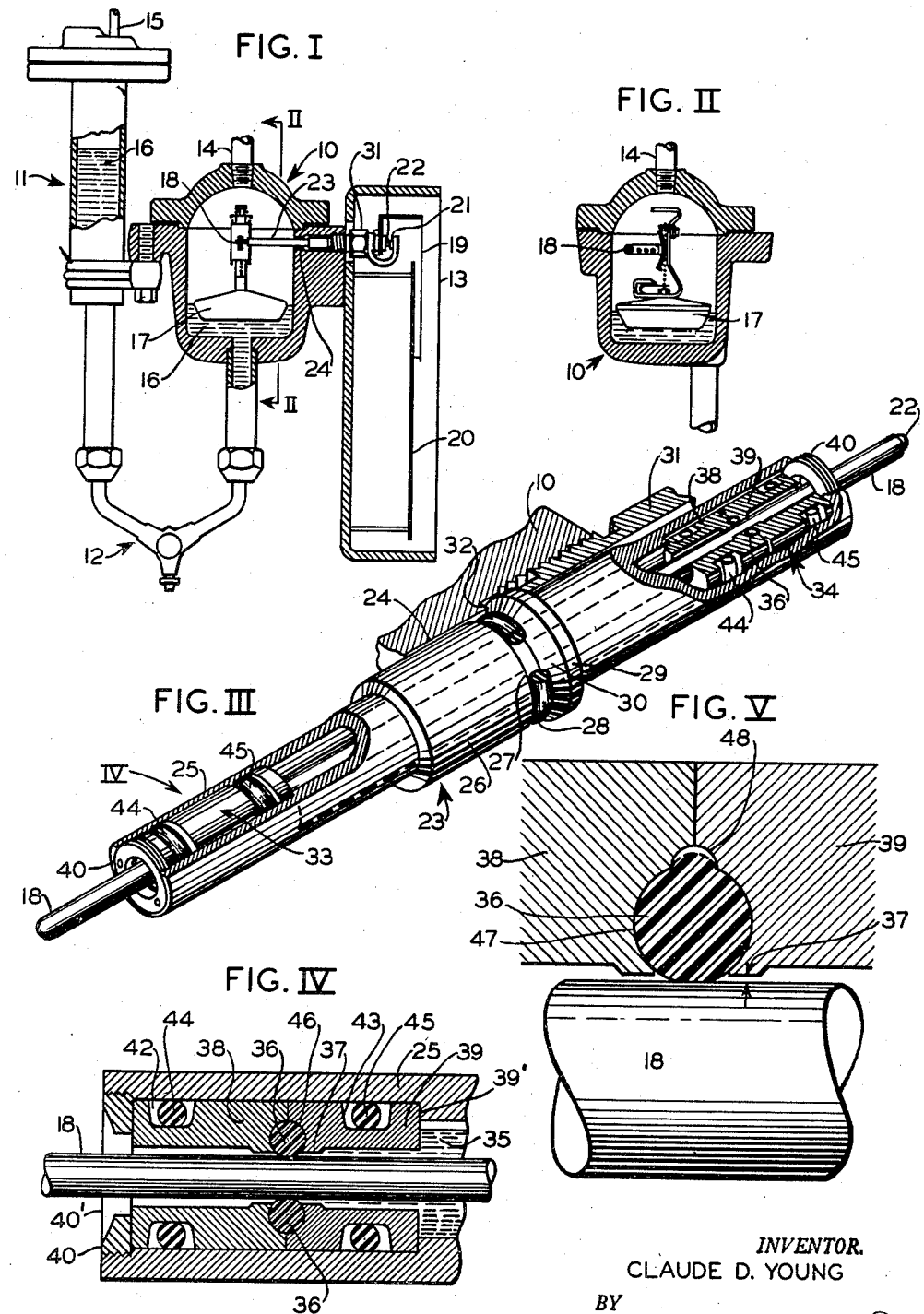

2,690,360

UNITED STATES PATENT OFFICE 2,690,360

PRESSURETIGHT SEAL

Claude D. Young, Foxboro, Mass., assignor to The Foxboro Company, Foxboro, Mass., a corporation of Massachusetts Application April 17, 1951, Serial No. 221,367

1 Claim. (Cl. 308—36.1)

This invention relates to fluid pressure sealing devices and has particular reference to O ring fluid pressure sealing devices.

It is an object of this invention to provide new and improved fluid pressure sealing O ring devices.

It is a further object to provide new and improved means for fluid pressure sealing a rotatable shaft.

Specifically disclosed herein as an illustrative application of this invention, is a pressure recording instrument with a rotatable shaft for transmitting recording movement from a high pressure area to a low pressure area through an instrument housing, with the rotatable shaft sealed against fluid pressure in accordance with this invention.

It is important, in such a shaft seal, to have a minimum of frictional torque on the shaft as between the seal and the shaft, in order that the recording movement, even if low powered, may be transmitted freely and accurately. Further, it is important to have a seal which avoids undesirable increased frictional torque on the shaft due to deformation of the O ring under pressure. Also, it is desirable to have a seal assembly which is inexpensive and simple to manufacture, and which may be readily disassembled for replacement of any part thereof.

It will be seen that these features are provided in structures embodying this invention.

Other objects and advantages of this invention will be in part obvious and in part pointed out hereinafter. These objects and advantages are attained by the novel apparatus described in the following specification, and they may be more readily understood by reference to the accompanying drawings.

Referring to the drawings:

Figure I is an elevation, in partial section, of a pressure operated recording flowmeter, as an illustration of an application embodying this invention;

Figure II is a sectional view of Figure I, taken as on line II—II in Figure I, in illustration of the mechanical connections in the recording movement system of the flowmeter;

Figure III is an enlarged perspective, in partial section, of a pressuretight bearing assembly embodying this invention;

Figure IV is a vertical central section of a pressuretight bearing unit of this invention, as indicated at IV in Figure III; and Figure V illustrates an alternative structure, in a showing comparable to a central fragment of Figure IV.

The instrument

Referring to Figure I, the instrument shown is a common mercury manometer. Such an instrument is customarily associated with a pipe line (not shown), to measure flow therein. The usual orifice plate is placed in the pipe, a high pressure tap is taken on the upstream side of the orifice plate, and a low pressure tap is taken on the downstream side. These taps are connected to the manometer, as will be described.

The manometer comprises, generally, a high pressure float chamber unit 10, a low pressure range chamber unit 11, and a connection pipe 12, joining the lower portions of these units. A recording unit 13 is secured to the high pressure unit 10. The high pressure tap from the pipe line is connected to the unit 10, as at 14, and the low pressure tap is connected to the unit 11, as at 15.

Within the two units, a body of mercury 16 is free to move in and between the units in a representation of the pressure differential created by the orifice plate, with this pressure differential a function of the flow in the pipe line.

Within the high pressure unit 10, a float 17 moves up and down with the mercury level, and this movement is translated into rotary movement in a shaft 18, through a chain connected bracket and sector arrangement, as shown in Figures I and II. Details of this connection are not pertinent to this invention, but may be fully understood by reference to Patent No. 1,686,263 to Edgar H. Bristol, dated October 2, 1928. The shaft 18 is the subject of the pressuretight seal of this invention, as the shaft is extended from within the high pressure unit 10, through the wall thereof and into the recording unit 13, where atmospheric pressure prevails.

Within the recording unit 13, the rotary movement of the shaft 18 is translated into arcuate movement of a pen arm 19, in a plane perpendicular to the drawing, over a chart on a chart support 20. As a means of reducing the torque on the shaft 18, it is mounted in outer end engagement with a hardened steel insert 21, through an end bearing ball 22 on the outer, atmospheric pressure end of the shaft.

The pressuretight assembly

Referring to Figure I, the rotatable shaft 18 is a part of a pressuretight assembly 23, mounted in an opening 24 in the wall of the high pressure unit 10 as the means of extending the shaft 18 through the wall of the unit under pressure seal conditions. The assembly 23 is secured to the unit 10 in a manner to be explained herein in connection with Figure III.

Figure III shows the pressuretight assembly 23 with an elongated housing 25 through which the shaft 18 extends. The housing 25 is generally cylindrical, with a central, greater diameter portion 26 to fit closely in the opening 24 of the high pressure unit 10. At one end of the raised portion 26 an annular groove 27 is provided, with an O ring 28 therein. The O ring may be formed of synthetic rubber suitable for exposure without harm, to wide temperature ranges and a substantial variety of chemicals. Beyond the annular groove 27, the greatest diameter 29 of the housing 25 is provided, with a side face 30, facing the O ring 28 and extending away therefrom in a conical taper.

The manner of securing the whole assembly 23 to the unit 10 is indicated by a showing, in Figure III, of a fragment of the unit 10 and a fragment of a securing nut 31, in position of assembly with respect to the assembly 23. In the unit 10, the opening 24 is provided with a shoulder 32 against which the taper face 30, of the pressuretight assembly, is forced by tightening the securing nut 31 against the diameter 29 through a threaded connection between the securing nut 31 and the housing 10. The combination of the contact between the shoulder 32 and the taper face 30, and the O ring 28, provides a very effective rigid connection pressure tight seal.

The seal with which this invention is more particularly concerned is within the housing 25, between the rotatable shaft 18 and the inner wall of the housing. The inner configuration of the housing is cylindrical, with a reduced diameter at each end of the housing. Located within each of these reduced diameters is a pressuretight unit, as indicated at 33 and 34. The construction and assembly of these units is detailed in Figure IV. It is within the concept of this invention that, for certain applications, a single pressure tight unit may be used at one end of the housing, with an ordinary bearing at the other end.

Further, whether one or both pressuretight units are used, it is desirable in some applications to use a foreign matter seal in the form of a grease filler 35, Figure IV, within the housing 25, between the pressure tight, or bearing units 33 and 34. For convenience of illustration, grease is shown in Figure IV but not in Figure III. A useful grease for this purpose may be a silicone grease made by the use of lithium soap. The torque factor with respect to the rotatable shaft 18 is an important consideration in the use of grease in this manner. The torque must be kept at a minimum. The effect of the contact of the grease with the inner wall of the housing, as the shaft is rotated, must be considered, as well as the possibility of undesirable shear effects within the grease itself, at different diameters. If the grease, in composition and volume, is selected with these factors in mind, it will be useful as a seal against dirt and other foreign matters without undesirably increasing the torque on the rotatable shaft.

For details of the pressure tight units 33 and 34, reference is made particularly to Figure IV, and also to the showing in Figure III. Units 33 and 34 are identical, so only unit 33 is shown in Figure IV.

The rotatable shaft 18 extends through the housing 25, along the axis thereof. There is no metal to metal contact between the shaft 18 and any part of the pressuretight assembly 23. The only supporting contacts between the shaft 18 and the assembly are at longitudinally central portions of each pressuretight unit, through plastic O rings 36, one in each unit. As in Figure IV, the O ring 36 is concentric with the shaft 18 and has its inner periphery closely fitted to the shaft 18. As will be explained later herein, these O rings are closely and substantially completely confined, and restricted against any appreciable bodily movement in any direction.

A preferred material for the plastic O rings 36 is polymerized tetrafluoroethylene. "Teflon" is such a plastic. This material is very stable over a wide range of temperatures and it withstands the attack of many chemicals. Thus the pressuretight assembly of this invention may be used without harm in any of a great variety of industrial applications. Even more important is the characteristic that exceptionally heavy loads are required to force this material through narrow openings. As shown in Figure IV, the structure of this invention confines the O ring except for a narrow opening 37 about the shaft 18.

Another factor of importance is that the plastic O ring has a somewhat soapy surface, providing a bearing surface which has little or no need for externally supplied lubricant.

The bearing unit comprises two cylindrical sleeves 38 and 39, clamped end to end and against an inner shoulder 39' of the housing 25. A threaded closure 40 is mounted in the end of the housing 25, for this purpose. An opening 40' is provided in the closure 40 to permit the passage of the rotatable shaft 18 therethrough with substantial clearance. The cylindrical sleeves 38 and 39 fit closely within the housing 25, and are provided with outer annular grooves 42 and 43. Within these grooves are synthetic rubber O rings 44 and 45 in pressure and foreign matter sealing relation between the sleeves 38 and 39 and the inner wall of the housing 25.

The sleeves 38 and 39 are provided with cooperating configurations so as to form, between them, an annular recess 46 for receiving the plastic O ring 36. The recess 46 is formed in substantially complete conformity with the at rest, i. e., prior to application of pressure load, contours and dimensions of the O ring. The recess 46 is formed to substantially completely encompass the O ring, confining it against appreciable bodily movement in any direction. Only a small, inner peripheral strip of the O ring is exposed as a sealing and bearing surface. The sleeves 38 and 39 have, generally, an inner diameter which gives substantial clearance to the shaft 18, but this diameter is reduced adjacent the plastic O ring, as at 37, to provide a narrow opening as the only escape, along the shaft 18, for the O ring under pressure. Further this reduced diameter provides a solid backing for the shaft 18 as a safety factor under shock conditions.

A small clearance may be provided throughout the O ring recess 46 to allow for flow of the O ring under pressure without undesirably increasing the torque on the shaft 18. An O ring recess with such a clearance, as well as one with the form shown in Figure V, is considered to be in substantially complete conformity with the at rest contours and dimensions of the O ring.

Figure V illustrates a variation of the plastic O ring containing recess, here indicated as having an annular main portion 47 and an annular secondary portion 48. The main portion 47 confines and encompasses the O ring in like manner with the recess 46 of Figure IV, except that the confinement and dimensions may be closer, if desired. The secondary recess portion 48 provides a space for the O ring to flow into, under pressure, without undesirably increasing the torque on the shaft 18.

This invention thus provides a new and improved pressuretight O ring seal, and particularly, a new and improved pressuretight O ring seal for a rotatable shaft, with a low torque factor on the shaft, and with complete and ready interchangeability of all parts of the assembly by the simple removal of end closure members.

I claim:

A pressuretight bearing assembly comprising an elongated housing, a rotatable shaft extending through said housing, and a pressuretight bearing unit at each end of said housing for supporting said shaft in said housing, each of said bearing units comprising a two part bearing support, said parts having cooperating contours forming an inner annular recess, a plastic O ring bearing substantially completely confined in and by said recess with only a small, inner peripheral strip exposed as the only bearing contact of said unit with said shaft, said parts, further, each having an annular outer recess, with an O ring in each of said outer recesses as a pressure seal between said parts and said housing.

References Cited in the file of this patent

UNITED STATES PATENTS

| Number | Name | Date |
|---|---|---|
| 845,085 | Hicks | Feb. 26, 1907 |
| 2,462,596 | Bent | Feb. 22, 1949 |
| 2,479,711 | Arutunoff | Aug. 29, 1949 |
| 2,570,117 | Hallstrand | Oct. 2, 1951 |
| 2,593,193 | Rockwell | Apr. 15, 1952 |
| 2,615,763 | Wolford | Oct. 28, 1952 |
| 2,621,885 | Schmitt | Dec. 16, 1952 |

OTHER REFERENCES

"Taylor Technology," Taylor Instrument Co., autumn 1949, vol. 2, No. 2, page 17.